United States Patent [19]

Ishimi

[11] Patent Number: 4,539,867
[45] Date of Patent: Sep. 10, 1985

[54] STEPLESS TRANSMISSION GEAR SYSTEM FOR AUTOMOBILES

[76] Inventor: Bunichi Ishimi, 5-15, 2-chome, Shinmori, Asahi-ku, Osaka, Japan

[21] Appl. No.: 548,138

[22] Filed: Nov. 2, 1983

[30] Foreign Application Priority Data

Jul. 1, 1983 [JP] Japan .................. 58-120621

[51] Int. Cl.³ .............. F16H 3/44; F16H 57/10; F16H 1/28
[52] U.S. Cl. .................. 74/793; 74/804; 74/803
[58] Field of Search ............ 474/49; 74/793, 803, 74/804

[56] References Cited

U.S. PATENT DOCUMENTS 4,128,084  12/1978  Sutherland .................. 74/804 X

FOREIGN PATENT DOCUMENTS

| 241150 | 10/1962 | Australia | 74/793 |
| 501183 | 2/1951 | Belgium | 74/804 |
| 2417834 | 11/1974 | Fed. Rep. of Germany | 74/804 |
| 2911713 | 10/1980 | Fed. Rep. of Germany | 74/793 |
| 483278 | 6/1917 | France | 74/793 |
| 1086102 | 2/1955 | France | 74/804 |
| 1064127 | 4/1958 | France | 74/804 |
| 367144 | 1/1939 | Italy | 74/803 |
| 923508 | 4/1963 | United Kingdom | 74/804 |

Primary Examiner—George H. Krizmanich
Assistant Examiner—Dirk Wright
Attorney, Agent, or Firm—Wenderoth, Lind & Ponack

[57] ABSTRACT

In a stepless transmission gear system for automobiles, a variable-diameter pinion mechanism cooperates with a stationary internal gear to permit the speed ratio of the input to output shafts thereof to be changed steplessly from a substantially infinitesimal ratio to an overdrive ratio, the diameter of said pinion mechanism being continuously variable with the eccentricity thereof off the axis of the input shaft. Cars employing the present transmission gear system could dispense with a clutch and even a brake.

8 Claims, 9 Drawing Figures

STEPLESS TRANSMISSION GEAR SYSTEM FOR AUTOMOBILES

BACKGROUND OF THE INVENTION

The present invention relates to a stepless transmission gear system for automobiles and, more particularly, to such a transmission gear system which can continuously or steplessly change the speed of its output shaft with respect to the speed of its input shaft.

Heretofore, a variety of transmission gear systems for automobiles have been proposed from a relatively simple selective gear type to much complicated automatic transmission systems having a torque converter and the like elaborate mechanisms. However, in cars having such a selective gear or other type of transmission system used in combination with a clutch, a beginner driver encounters starting difficulties and often causes an engine stall because he is not skilled well in the clutch operation. Especially, when starting the car on an upward slope, the difficulties are furthered because he must operate a brake simultaneously with a clutch. Although cars having an automatic transmission system without a clutch pedal can be operated much more easily and smoothly, such a transmission system involves expensive and much complicated mechanisms.

SUMMARY OF THE INVENTION

Accordingly, it is an object of the present invention to provide an improved transmission gear system for automobiles having a relatively simplified and inexpensive structure which can change the speed ratio of its output to input shafts continuously from a substantially infinitestimal ratio to an overdrive ratio.

Another object of the present invention is to provide such a transmission gear system which can obviate a clutch and which nevertheless can smoothly change the car speed including its start and stop by operating a single shifter lever or a like means.

In accordance with the present invention, such a continuous speed change is permitted by a variable-diameter pinion mechanism which in engagement with a stationary internal gear structure makes a planetary motion around the axis of the input shaft when swung therefrom to an eccentric position thereto. The diameter of the pinion mechanism is continuously variable with its eccentricity which in turn is continuously variable with the position of the shifter lever. In the neutral position of the shifter lever where the pinion mechanism is in axial alignment with the input shaft, it has a diameter substantially equal to that of the internal gear structure and thus cannot be rotated in any directions of drive even if a driving force is applied from the output shaft by the inertia of the car. In this sense, the car may dispense with at least a hand brake or even the entire brake equipment.

These and other objects and features of the present invention will become apparent from the following description of the preferred embodiment thereof taken in connection with the accompanying drawings.

DESCRIPTION OF THE PREFERRED EMBODIMENT

Figure 1:
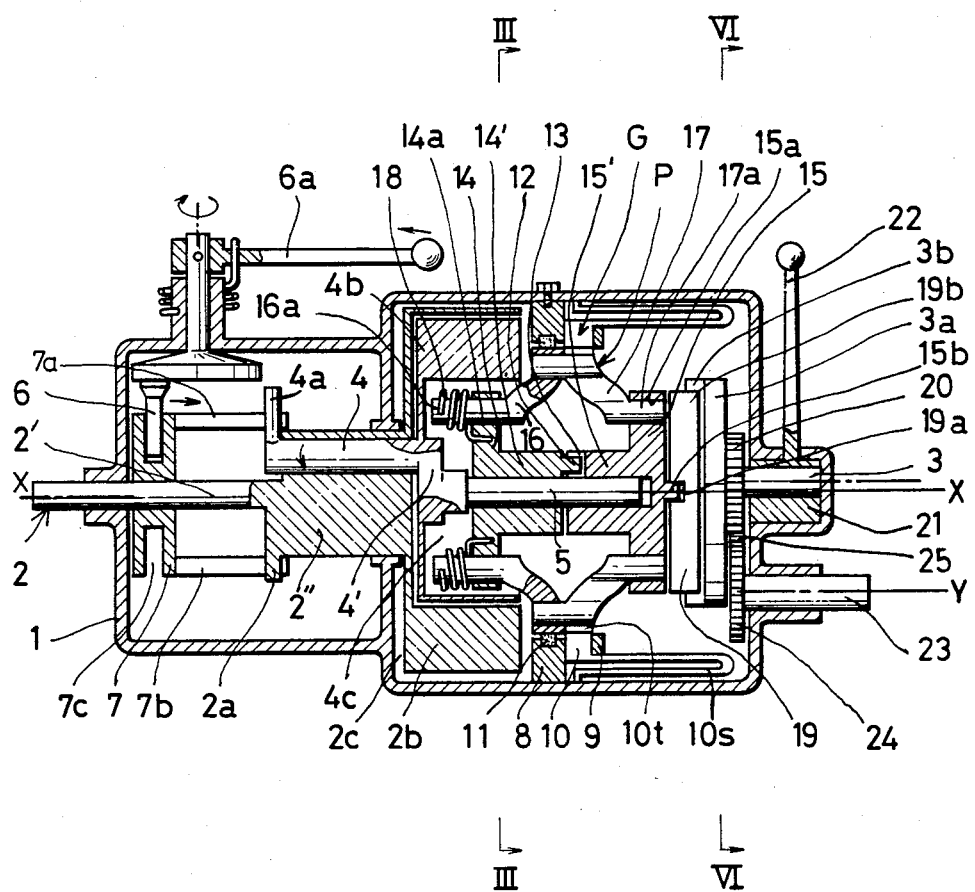
FIG. 1 is a longitudinal section of one preferred embodiment of the transmission gear system according to the present invention, showing its neutral position.

Referring to FIG. 1, the transmission gear system of the present invention includes a casing 1, an input shaft 2 at one end of the casing 1 and an output shaft 3 at its other end. The input shaft 2 is coupled at its outer end to a driving source such as a crankshaft of an internal combustion engine (not shown). The input and output shafts 2 and 3 are substantially in axial alignment with each other and rotatably mounted in the casing 1 by means of bearings. The input shaft 2 has a first section 2' on the driving source side and a second section 2" on the inner side thereof which is substantially larger in dimeter than the first section 2'. The second section 2" of the input shaft 2 is formed with a longitudinal through-hole eccentrically to its axis X to receive a crankshaft 4 rotatably. The crankshaft 4 is integrally formed at its inner end with a web 4' and with a crank pin 5 which extends axially inwardly from the web 4'. The crank pin 5 is disposed in axial alignment with the input shaft 2 when the transmission system is in its neutral position.

At the outer end of the crankshaft 4, namely, at its end opposite to the web 4', a pin 4a projects radially outwardly therefrom. At the end of the second section 2" of the input shaft near to its first section 2', a pin 2a is integrally formed and projects radially outwardly from its peripheral side (See FIG. 2). On the first section 2' of the input shaft 2, a cylindrical sleeve 7 is fitted slidably and rotatably so that its second section 2" is slid thereinto as the sleeve 7 is moved inwardly. The sleeve 7 is formed with an annular groove 7c in which a shifter pin 6 is slidably engaged. When a shifter lever 6a is turned, the shifter pin 6 turns about the pivotal axis of the shifter lever. Thus, as the shifter pin 6 turns as received in the groove 7c, the sleeve 7 is pushed thereby axially inwardly.

Figure 2:
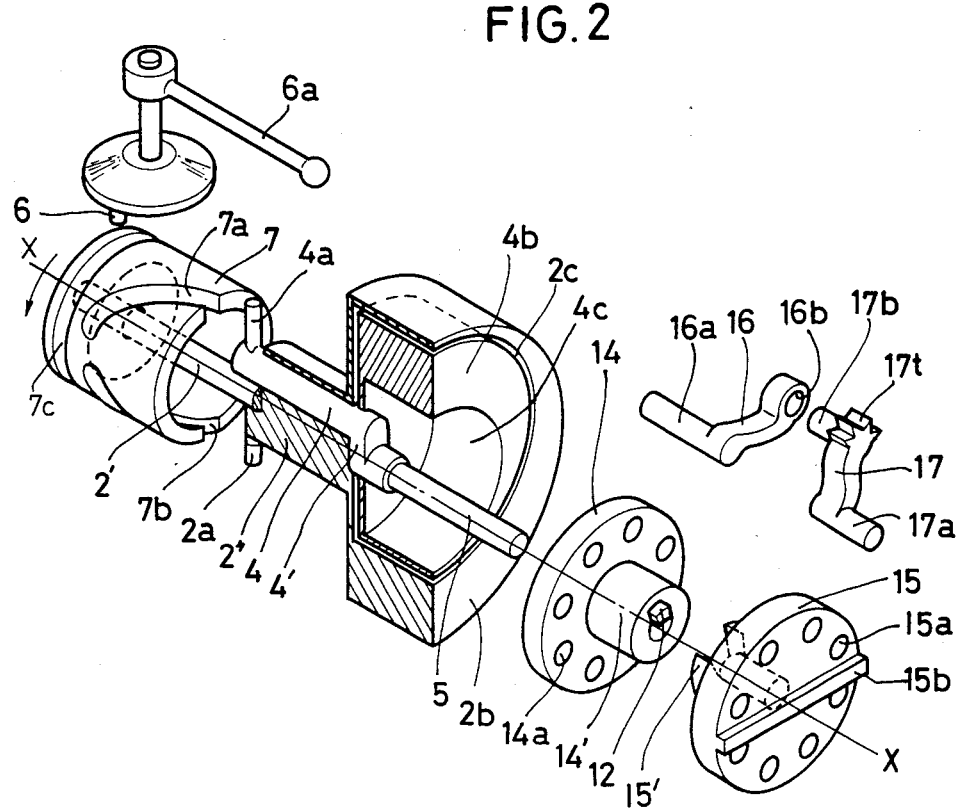
FIG. 2 is a partially broken exploded perspective of a part of the embodiment.

In the cylindrical wall of the sleeve 7 are formed a pair of slots 7a and 7b to slidably receive the pins 4a and 2a. The slit 7a is helically cut, while the slit 7b may be axially straight or is helical inversely to the helix of the slit 7a. However, in order to minimize the axial length of the sleeve 7, it is preferable to helically cut the slit 7b, as shown in FIG. 2. Further, although in FIGS. 1 and 2 the pins 2a and 4a are disposed diametrically opposite positions for the clarity of illustration, they may be disposed at any relative positions, as desired. In such a case, the slits 7a and 7b must be cut correspondingly thereto, of course.

As the shifter pin 6 pushes the sleeve 7 axially inwardly, the sleeve slides on the input shaft 2 under the guidance of the pin 2a to move the pin 4a angularly about the axis of the crankshaft 4 and thus to rotate the latter. The rotation of the crankshaft 4 in turn causes the crank pin 5 to swing off the axis X of the input shaft 2. The speed of the output shaft 3 with respect to the input shaft is determined by the eccentricity of this crank pin 5 off the axis X of the input shaft 2. If the slit 7b is helical as shown in FIG. 2, the sleeve 7 is rotated in the direction of the arrow while shifting axially inwardly, and this rotation acts to increase the angular displacement of the pin 4a relative to the axial displacement of the sleeve 7. Actually the pin 4a and thus the crank pin 5 can be turned around the axis of the crankshaft 4 through an angle of up to about 180° from their original positions.

On the other hand, the input shaft 2 has a balance wheel 2b which is integral with and extends radially outwardly from the inner end of its second section 2". The balance wheel 2b is formed on its output shaft side with a circular recess 2c which is coaxial with the crankshaft 4 as shown in FIGS. 1 and 2. In the recess 2c is placed another balance wheel 4b which is integral with and extends radially outwardly from the web 4' of the crankshaft 4. The balance wheel 4b is also formed with a circular recess 4c which is coaxial with the crank pin 5. These balance wheels 2b and 4b cooperate with each other to counterbalance the deviation, from the axis of the input shaft 2, of the center of gravity of the system including the crank pin 5 and the rotating parts associated with it, when the machine is in operation. Thus, the balance wheels are designed so that the cubature of the circular recess 4c will be substantially equal to the total cubature of the crank pin and its associated rotating parts, which can be determined by dividing the total weight of these parts by the specific gravity of their material, for example, steel.

Figure 3:
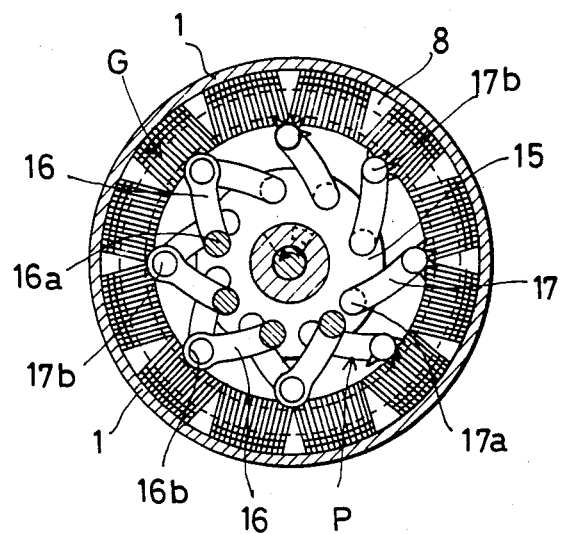
FIG. 3 is a cross-section taken on the line III—III of FIG. 1.
Figure 4:
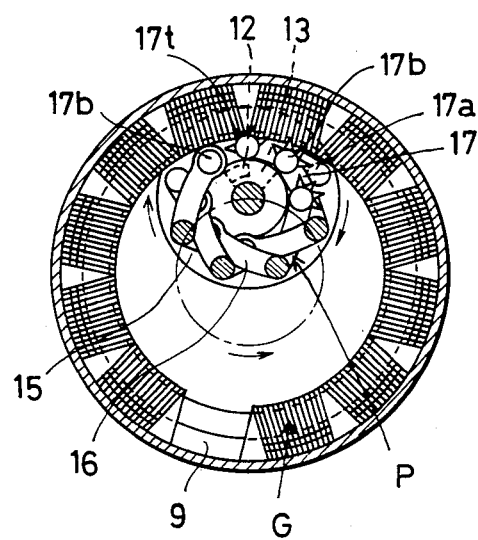
FIG. 4 is a cross-section similar to FIG. 3 but showing a state in which the crank pin is in its most eccentric position.
Figure 5A:
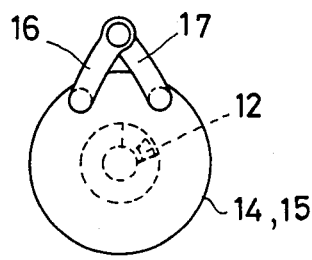
FIGS. 5(a) through 5(d) show schematically how a tooth of the pinion mechanism used in the gear system of FIG. 1 collapses to vary the diameter of the pinion.
Figure 5B:
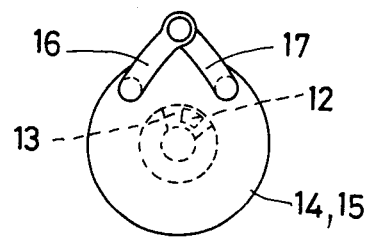
Figure 5C:
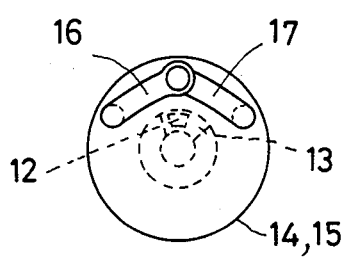
Figure 5D:
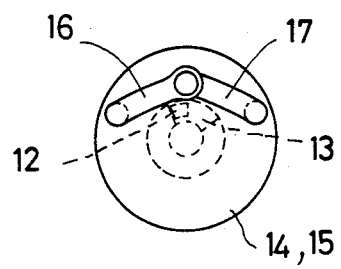

The casing 1 has a ring 8 integral therewith or secured thereto along its inner periphery almost midway of the crank pin 5. On the side of the ring 8 opposite to the input shaft 2, a plurality of fringe boxes 9 are secured consecutively therealong. The fringe box 9 functions to hold in place a bunch of substantially U-shaped elastic metal chips so as to extend axially of the system as shown in FIG. 1. The metal chips 10 are, for example, stamped from sheet steel. Each metal chip 10 has its enlarged end portion retained in the fringe box 9 and its other end secured to the inner wall of the casing 1. Its intermediate portion indicated at 10s exerts substantially a radially inward spring action on the enlarged end portion. In each bunch of metal chips, the enlarged end portion of each chip 10 is depressible radially outwardly against the resilience of the spring portion 10s. The radially inner edges of the enlarged end portions of the outermost metal chips in each fringe box are contiguous to the corresponding edges of those in its adjacent boxes. Thus, the metal chips 10 held in bunches in their associated fringe boxes provide as a whole a stationary internal gear structure G having internal gear teeth 10t defined by their radially outwardly depressible enlarged end portions, as best seen in FIGS. 3 and 4. The internal gear having the aforementioned structure can provide substantially a full accommodation to the change in diameter or pitch of a pinion mechanism which will be described below. On the inner peripheral surface of the ring 8 is secured a buffer ring 11 made of plastic or a like material.

Further, the transmission gear system of the present invention has inside its internal gear G a collapsible or variable-diameter pinion mechanism P. The mechanism includes a pair of stemmed wheels 14 and 15 which are rotatably mounted on the crank pin 5 with their stem portions 14' and 15' opposed to each other, as shown in FIGS. 1 and 2. The free end of the stem portion 14' of the wheel 14 is formed with a projection 12 which is inserted into a radially sectoral recess or cutout 13 (See FIG. 3) formed in the opposing free end of the stem portion 15' of the other wheel 15. Since the projection 12 has a circumferential play in the sectoral recess 13, the wheel 14 is rotatable relative to the wheel 15 within a limit defined by this play. The wheels 14 and 15 are formed with a plurality of bearing holes 14a and 15a at regular intervals, as shown in FIG. 2.

The reference numerals 16 and 17 designate pairs of arms which are pivotable on their end shafts 16a and 17a, respectively, which are rotatably supported in the bearing holes 14a and 15a of the wheels 14 and 15, respectively. In each pair of arms, the arms 16 and 17 are angularly displaced, in end view, from each other about the axis of the crank pin 5, and are articularly connected together at their other ends, as shown in FIGS. 3 and 5. More specifically, the arm 16 is formed at its other end opposite from its end shaft 16a with a bearing hole 16b, in which an end shaft 17b of the arm 17 opposite from the shaft 17a are rotatably fitted. Further, a spring means 18 is provided on the end shaft 16a of the arm 16 to normally urge the latter to extend radially outwardly. Therefore, when no external force is applied, the arms 16 pull their counterpart arms 17 toward themselves while being accompanied by a relative rotation of the wheels 14 and 15 within a limit defined by the play between the projection 12 and the recess 13. However, if a radially inward compression is applied to the articulation of the paired arms 16 and 17, the wheels 14 and 15 undergo a reversed relative rotation to increase the angle formed by the arms 16 and 17 against the action of the spring means 18 (See FIG. 5). In other words, each pair of arms 16 and 17 which is permitted an articular motion by the relative rotation of the wheels 14 and 15 forms, so to speak, a collapsible tooth. The wheels 14 and 15 and their associated arms 16 and 17 thus form a variable-diameter or collapsible pinion mechanism P, which is engaged with the aforementioned internal gear G, as shown in FIGS. 3 and 4.

Each tooth of the pinion mechanism P has bite means 17t integrally formed on the end shaft 17b of the arm 17 and projecting therefrom radially of the pinion mechanism so as to ensure a positive engagement with the internal gear teeth 10t described previously. The engagement is made further positive by the spring action of the metal chips 10 of the internal gear G. Meanwhile, as the pinion mechanism P is rotated in engagement with the internal gear G, the radially outermost end surfaces of the arms 16 are brought into contact with the inner surface of the aforementioned buffer ring 11 to moderate the force of the spring means 18 that urges the bite means 17t of the pinion mechanism P into the internal gear teeth 10t. Thus, the bite means 17t always bite or mesh with the internal gear G at a substantially constant depth regardless of the eccentricity of the crank pin 5.

Further, in order to permit the inward collapse of the teeth of the pinion mechanism P, their arms 16 and 17 are crooked in an elongated S-shape or crank shape as viewed in their axial cross-sections (See FIG. 1), and the arms 16 and 17 can overlap the radially inner portions of their circumferentially adjacent arms when they are compressed radially inwardly (See FIG. 4).

The rotation of the pinion mechanism P is transmitted to the output shaft 3 through an Oldham's shaft coupling interposed therebetween. The Oldham's shaft coupling includes a diametrical ridge 15b integrally formed on the end of the wheel 15 opposite from its stem portion 15', a flange 3a integral with the output shaft 3 and an intermediate disk 19 interposed between the wheel 15 and the flange 3a. The disk 19 is formed on its one side facing the wheel 15 with a diametrical groove 19a to slidably receive the ridge 15b of the wheel 15 and on its other side with another diametrical groove 19b at right angles to the groove 19a to slidably receive a diametrical ridge 3b integrally formed on the flange 3a of the output shaft 3 (See FIG. 1). Of course, the drive power may be transmitted by employing other known coupling means used to transmit the rotation of a drive shaft to a driven shaft eccentric thereto.

Figure 6:
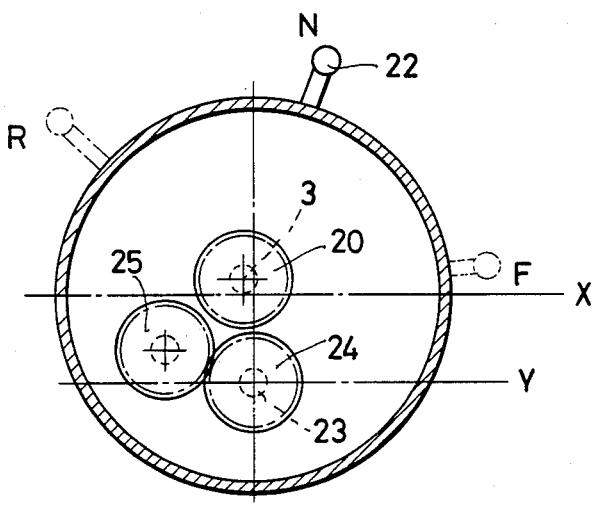
FIG. 6 is a cross-section taken on the line VI—VI of FIG. 1.

The output shaft 3 is provided with a reversing gear mechanism. For example, the reversing gear mechanism may comprise a driving gear 20 which is coaxial and integral with the output shaft 3, a bearing block 21 rotatably mounted to the end wall of the casing 1 and having an eccentric bearing hole rotatably supporting the output shaft 3, a reversing lever 22 for rotating the bearing block 21 about its axis, a driven gear 24 integral with a coupling shaft 23, and an idle gear 25 which is always in mesh with the gear 24, as shown in FIGS. 1 and 6. The bearing block 21 is positioned so that, when the lever 22 is brought to its forward drive position indicated at F in FIG. 6, the output shaft 3 comes to an axially aligned position with the input shaft 2, where the drive gear 20 coaxial with the output shaft 2 engages the driven gear 24. If the lever 22 is swung to its rearward drive position R, the drive gear 20 is engaged with the idle gear 25 to reverse the rotation of the gear 24 and the coupling shaft 23. At the neutral position N of the lever 22, the coupling shaft 23 is disconnected from the output shaft 3. Such a neutral position may be conveniently used when any requirement occurs to operate the coupling shaft 23 and the succeeding rotating parts freely from the transmission gear system, for example, for maintenance purpose, or when engine braking is not desired. Further, a known free-wheel mechanism may be incorporated in the transmission gear system of the present invention.

In operation, as the entire input shaft 2 including its balance wheel 2b is driven by a driving source (not shown), the crankshaft 4 and its balance wheel 4b revolve around the axis X of the input shaft 2. The sleeve 7, too, rotates with its groove 7b engaged with the pin 2a of the input shaft 2. However, when the shifter lever 6a is at its neutral position, the crankshaft 4 is not rotated on its own axis and the crank pin 5 is kept in axial alignment with the input shaft 2. When the crank pin 5 is at this neutral position, the collapsible teeth of the pinion mechanism P fully expand radially outwardly by the action of the spring means 18 as shown in FIGS. 1 and 3, so that the crank pin 5 rotates idly in the pinion mechanism. Further, since the pinion mechanism P has substantially the same diameter as that of the internal gear G and is held fast thereto with the spring means urging the bite means 17t radially outwardly, it cannot rotate in any directions even if any external force is applied from the output shaft 3. In this sense, the present transmission gear system can function as a brake when the shifter lever 6a is at its neutral position.

However, if the shifter lever 6a is operated to move the sleeve 7 axially inwardly via the shifter pin 6, the pin 4a of the crankshaft 4 engaged in the spiral groove 7a turns about the axis of the crankshaft 4 to swing the crank pin 5, together with the wheels 14 and 15, thereabout to a position eccentric to the axis X of the input shaft 2, as shown in FIG. 4. This swinging motion to the eccentric position is permitted because, the instant at least one tooth of the pinion P is compressed inwardly against the action of the spring 18, the wheels 14 and 15 turn relative to each other in such a direction that the paired arms 16 and 17 forming the tooth widen themselves (See FIG. 5). Simultaneously, all arms 16 will move away from their associated arms 17. In this manner, the diameter of the pinion mechanism P decreases proportionately to the eccentricity of the crank pin 5.

When brought to such an eccentric position, the crank pin 5 starts a planetary motion around the axis X of the input shaft 2 as the latter is driven. Its planetary motion in turn causes the rotation of the pinion mechanism P in engagement with the internal gear G. The rotation of the pinion mechanism P is then transmitted through the aforementioned Oldham's shaft coupling to the output shaft 3 and thence through the reversing gear mechanism to the coupling shaft 23.

Since the eccentricity of the crank pin 5 is continuously variable with the axial displacement of the sleeve 7 which is in turn variable continuously with the position of the shifter pin 6, the diameter of the pinion mechanism P can also be reduced continuously from its maximum shown in FIGS. 1 and 3 to its minimum shown in FIG. 4 by operating the shifter lever 6a. Therefore, by operating it, the speed ratio of the output shaft 3 to the input shaft 2 can be changed continuously from a substantially infinitestimal ratio to an overdrive ratio.

Although the present invention has been described with reference to specific embodiments thereof, it will be obvious to those skilled in the art that various changes and modifications may be made thereto without departing from the spirit and scope of the present invention.

What are claimed are:

1. A stepless transmission gear system for automobiles comprising:

a casing;

an input shaft coupled to an external driving source and rotatably mounted in said casing at one end thereof;

an output shaft rotatably mounted in said casing at the other end thereof substantially in axial alignment with said input shaft;

a crankshaft rotatably and eccentrically supported by said input shaft so as to revolve around the axis of said input shaft as the latter is driven, said crankshaft having a crank pin disposed substantially between said input and output shafts in said casing and in axial alignment therewith when the transmission gear system is in the neutral position thereof;

a shifter means operable from outside of said casing for turning said crankshaft around own axis thereof through an angle determined by the position of said shifter means to swing said crank pin therearound to a corresponding eccentric position off said axis;

a stationary internal gear means secured to the inner wall of said casing coaxially with said input shaft;

a variable-diameter pinion mechanism rotatably mounted on said crank pin and meshing with said internal gear means so as to make a planetary motion around said axis as said crank pin brought to said eccentric position revolves therearound, the diameter of said pinion mechanism being continuously variable with the eccentricity of said crank pin off said axis; and a coupling means for transmitting the rotation of said pinion mechanism to said output shaft when said pinion mechanism is making a planetary motion about said axis of said input shaft.

2. The stepless transmission gear system according to claim 1, wherein said input shaft has a first section on the driving source side thereof and a second section on the inner side thereof which is larger in diameter than said first section, said second section being formed with a through-hole parallel and eccentric to the axis thereof to support said crankshaft rotatably therein, and wherein said shifter means comprises:

a first pin projecting radially from the peripheral side of said crankshaft at an end thereof opposite from said crank pin;

a second pin disposed at an angle to said first pin and projecting radially from the peripheral side of said second section of the input shaft at an axial position near to said first pin;

a cylindrical sleeve slidably and rotatably mounted on said first section of the input shaft so that said second section can be slid thereinto as said sleeve is moved axially inwardly, said sleeve being formed with an annular groove at the outer end thereof, a first slit extending helically from the inner end towards said annular groove and a second slit having the same axial depth as said first slit and being helical inversely to the helix of said first slit;

said first and second slits adapted to receive said first and second pins, respectively;

a shifter lever disposed outside said casing; and a shifter pin slidably engaged in said annular groove in said sleeve, said shifter pin being moved by operating said shifter lever to move said sleeve axially inwardly and thereby to turn said first pin and thus said crankshaft about the axis thereof through an angle determined by the position of said shifter lever.

3. The stepless transmission gear system according to claim 1, wherein said internal gear means comprises:

an annular frame member integral with or secured to said casing along the inner periphery thereof;

a plurality of fringe boxes secured to said frame member on one end side thereof consecutively therealong; and bunches of substantially U-shaped elastic metal chips each having one end thereof held in place in said respective fringe box so as to form consecutive internal gear teeth and having the other end thereof secured to said casing, said internal gear teeth being depressible radially outwardly relatively to each other against the resilience of said metal chips forming the same; and wherein said variable-diameter pinion mechanism comprises:

a pair of stemmed wheels rotatably mounted on said crank pin with the stem portions thereof opposed to each other, said wheels being formed with a plurality of bearing holes at regular angular intervals and being rotatable relatively to each other;

a plurality of pairs of articulated arms having at one end articulated together substantially midway between said wheels and having at opposite ends thereof integral shafts rotatably supported in said bearing holes, each pair of said bearing holes interconnected by each pair of said arms being angularly displaced from each other about the axis of said crank pin;

a spring means mounted on at least one of each pair of said arms to normally urge said articulated ends thereof so as to expand radially outwardly so that each pair of said arms forms one tooth of said pinion mechanism;

bite means integrally formed on the articulated end of one of each pair of said arms and projecting radially of said pinion mechanism so as to ensure a positive engagement with said internal gear teeth, with the articulated end of the other arm thereof being brought into contact with the inner periphery of said frame member to keep the meshing of said bite means substantially at a constant depth.

4. The stepless transmission gear system according to claim 3 wherein said internal gear means further includes a buffer ring secured to said inner periphery of said frame member to moderate the force of said spring means urging said bite means toward said internal gear teeth.

5. The stepless transmission gear system according to claim 3, wherein one of said stemmed wheels is formed at the free end of the stem portion thereof with a projection which is inserted into a radially sectoral recess formed in the opposing free end of the stem portion of the other of said wheels, said projection having a circumferential play in said sectoral recess to permit a relative rotation of said pair of wheels within a limit defined thereby.

6. The stepless transmission gear system according to claim 1, wherein said coupling means comprises an Oldham's shaft coupling.

7. The stepless transmission gear system according to claim 1, wherein said output shaft is provided with a reversing gear mechanism.

8. The stepless transmission gear system according to claim 1 further including a freewheel mechanism for automatically releasing the engine braking when the same is not desired.

* * * * *